Sept. 10, 1963 M. G. WHITEHEAD 3,103,161
BARBECUING APPARATUS
Filed April 6, 1959 4 Sheets-Sheet 1

INVENTOR.
MERL G. WHITEHEAD
BY *m. a. Hobbs*
ATTORNEY

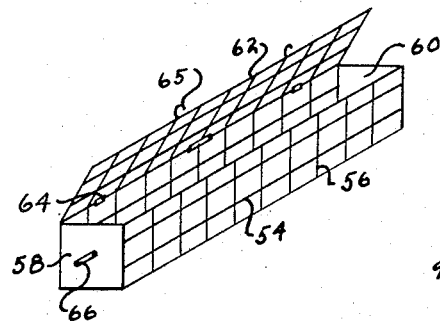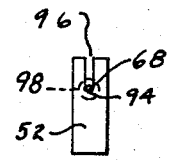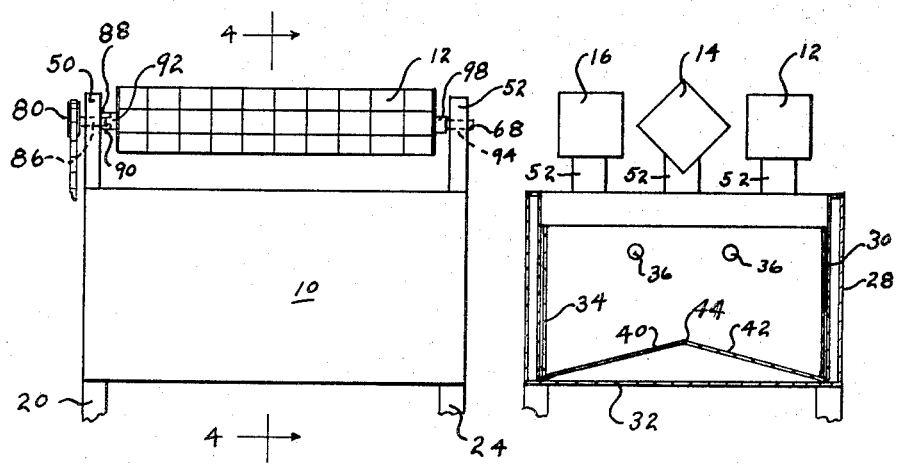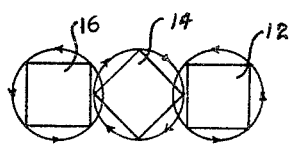

Sept. 10, 1963         M. G. WHITEHEAD         3,103,161
                    BARBECUING APPARATUS
Filed April 6, 1959                         4 Sheets-Sheet 3

INVENTOR.
MERL G. WHITEHEAD
BY
M. A. Hobbs
ATTORNEY

Sept. 10, 1963    M. G. WHITEHEAD    3,103,161
BARBECUING APPARATUS
Filed April 6, 1959    4 Sheets-Sheet 4

INVENTOR.
MERL G. WHITEHEAD
BY M. A. Hobbs
ATTORNEY

# United States Patent Office 3,103,161
Patented Sept. 10, 1963

3,103,161
BARBECUING APPARATUS
Merl G. Whitehead, R.R. 4, Goshen, Ind.
Filed Apr. 6, 1959, Ser. No. 804,426
2 Claims. (Cl. 99—427)

The present invention relates to an apparatus for preparing food and more particularly to an apparatus for barbecuing or broiling meat. This application is a continuation-in-part of my copending application Serial No. 535,973, filed September 22, 1955, now U.S. Patent No. 2,883,923.

One of the principal objects of the present invention is to provide a power driven apparatus for barbecuing or broiling meat wherein a number of pieces of meat may be simultaneously turned so that all sides will be subjected to the heat substantially uniformly to automatically baste the meat while it is being cooked over an open fire.

Another object of the invention is to provide an apparatus for barbecuing or broiling a number of pieces of meat simultaneously, wherein the meat is turned automatically and the pieces of meat can be removed as they become done without interrupting the operation of the apparatus in respect to the pieces of meat still being cooked.

Still another object of the invention is to provide a relatively simple compact barbecuing or broiling apparatus which can easily be moved from one location to another and which does not require the services of any skilled person to handle the meats in the barbecuing operation.

Another object is to provide an apparatus for automatically barbecuing a number of relatively small pieces of meat such as chicken, wherein meats at various stages of preparation can be handled simultaneously and the cooked meat removed and uncooked meat inserted without interrupting the operation of the entire apparatus.

A further object of the invention is to provide a barbecuing or broiling apparatus the effective size and/or capacity of which can be varied to suit the requirements at a barbecue, picnic, party or other gathering.

Additional objects and advantages of the present invention will become apparent from the following description read in conjunction with the accompanying drawings, wherein;

FIGURE 2 is an oblique view of one of the meat holding means shown in FIGURE 1;

FIGURE 3 is a side elevation of my barbecuing apparatus, in which the lower portion has been omitted;

FIGURE 4 is a cross sectional view of the apparatus taken on line 4—4 of FIGURE 3;

FIGURE 5 is a detailed view of a support of the meat holding means shown in the preceding figures;

FIGURE 6 is a diagrammatic view of the meat holding means, showing an arrangement for obtaining compactness in the barbecuing apparatus;

Figure 1:
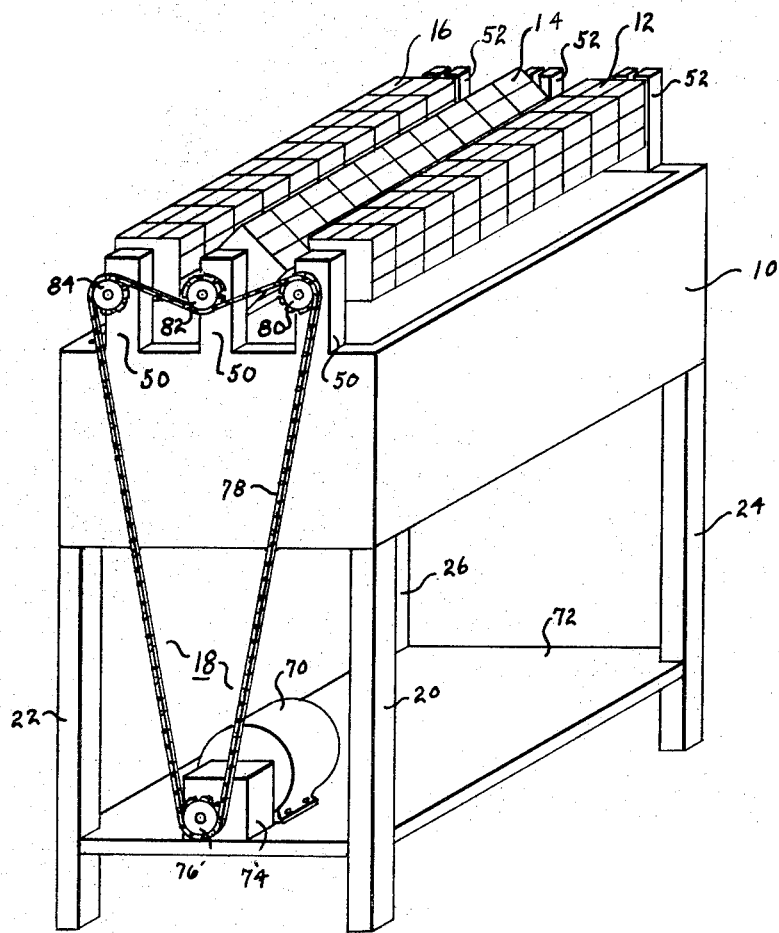
FIGURE 1 is an oblique view of my meat barbecuing and broiling apparatus, showing the operative relationship of the various parts.

Referring more specifically to the drawings and to FIGURE 1 in particular, numeral 10 designates a fire pit, numerals 12, 14 and 16 designate basket-like rotatable meat holders, and 18 indicates a power mechanism for driving the three rotatable meat holders. The fire pit shown in detail in FIGURE 4 is supported by four legs 20, 22, 24, and 26 and consists of an outside wall 28, an inside wall 30 spaced from said outside wall to provide space for insulating material such as fiber glass or rock wool. The walls rest on and are secured to a flat plate-like bottom 32 which in turn is secured by welding or other suitable means to the upper end of the four legs. The walls and bottom are preferably constructed of sheet metal or plate steel and if desired the inside surfaces of wall 30 and the bottom may be lined with ceramic material or other fire and heat resistant material. To facilitate starting a fire in the pit and removing the ashes therefrom, a removable fire pan 34 is preferably placed in the pit to hold the fuel such as charcoal. When the apparatus is to be placed in operation, the fire pan is removed from the pit, the charcoal placed in the bottom of the pan, ignited and permitted to burn until a good bed of coals is obtained. The pan is then placed in the pit ready for operation. Holes 36 are provided in each end of the pan for tongs or the like for use in inserting and removing the pan. The bottom of the pan is divided into two sections 40 and 42 sloping away from a longitudinal center ridge 44, to provide troughs along each side of the pan for the coals, leaving the center of the bottom uncovered. This distribution of the coals gives substantially equal and uniform heat to all three meat holders.

Meat holders 12, 14 and 16 are supported above the fire pit on members 50 at the driven end of the holders and on members 52 on the idling end of the holders, said members being rigidly secured to the upper edge of the end sections of the fire pit walls. The holders are evenly spaced side by side above the pit and, to conserve space and make the apparatus as compact as possible, are preferably arranged as shown in FIGURE 6. The position of the holders as shown in the figure permits the holders to be located as close as possible without bumping each other during rotation. To obtain satisfactory operation of the apparatus with this arrangement, rotation of the holders must be synchronized so that the sides of the two end holders are vertical as the sides of the center holder are positioned at a 45 degree angle.

The holders as shown in FIGURE 2 consists of spaced longitudinal and transverse rods or wires 54 and 56, respectively, welded together to form a rigid structure which is supported at its ends by rigid metal plates 58 and 60 to which the ends of the longitudinal rods are secured. A lid 62 of the same general construction as the sides closes the top of the holder and is pivoted along one side by three hinges 64 and fastened along the other side when closed by latches 65. Shafts 66 and 68 are rigidly secured to the center of plates 58 and 60, respectively, and form the axis on which the holders rotate.

The meat holders are rotated by an electric motor 70, mounted on a platform 72 beneath the fire pit, through a speed reducing mechanism 74, gear 76, chain 78 and gears 80, 82 and 84 for operating holders 12, 14 and 16, respectively. The speed reducing means is preferably of the variable speed type so that the speed of the holders can be varied for different cooking conditions. Any well known variable speed type is satisfactory. The chain passes over gear 80, under gear 82 and over gear 84 thus causing holder 14 to rotate in the opposite direction from holders 12 and 16, as shown in FIGURE 6. Since the construction of the drive mechanism for one meat holder is the same as those for the other holders, only one will be described in detail. Gear 80 is mounted on and secured to a shaft 86 which is journalled in a bearing in member 50 and held from endwise movement by a collar 88 of a coupling 90 secured to the end of said shaft on the opposite side of member 50. A second collar 92 which keys with collar 88 is secured on shaft 66 and permits the meat holder to be easily removed from its place over the fire pit.

Shaft 68, which is secured to the end of the meat holder opposite the driving mechanism, is supported by and rotates in a half bearing 94 in member 52. The upper half of the bearing is removed to form a slot 96 into which shaft 68 is placed when the meat holder is inserted in the machine. The portion of shaft 68 between the bearing and plate 60 is enlarged to form an annular shoulder 98 for abutting against the inside surface of member 52, thus preventing the holder from moving endwise and the coupling from becoming uncoupled while the holder is in operation. When it is desired to remove a particular holder, it is lifted until shoulder 98 clears member 52 and is then moved longitudinally away from the driving mechanism until it is uncoupled.

In the modified form of the invention shown in FIGURES 7 through 15, numeral 102 indicates a sheet iron fire pit, 104 and 106 basket-like meat holders driven by separate electrical motors and integral gear reduction mechanisms 108 and 110 connected by shafts 112 and 114 to holders 104 and 106, respectively. The pit which is rectangular in shape is supported on four legs 116, 118, 120 and 122 removably connected thereto by fixtures 124, 126, 128 and 130, respectively, joined to the ends of the pit. A plurality of air holes 132 are provided in the upper portion of the side wall of the pit and a cover 134 is attached by a hinge 136 to the rear wall of the pit for closing the upper side of the pit while the apparatus is in use. The cover is provided with a handle 138 and is adapted to tilt back to a point where it will remain open once it is lifted to its fully opened position.

Figure 8:
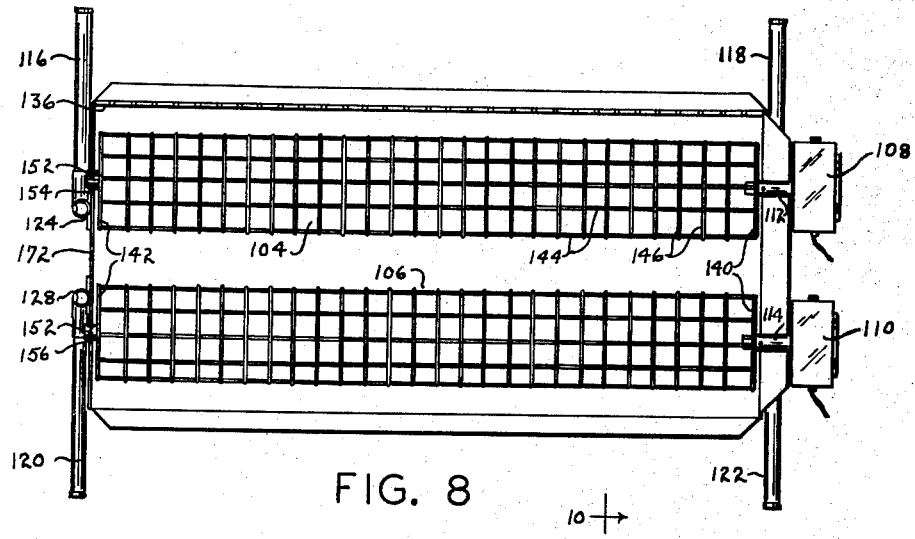
FIGURE 8 is a top plan view of the embodiment shown in FIGURE 7 with the cover thereof removed to better show the structure of the unit.
Figure 7:
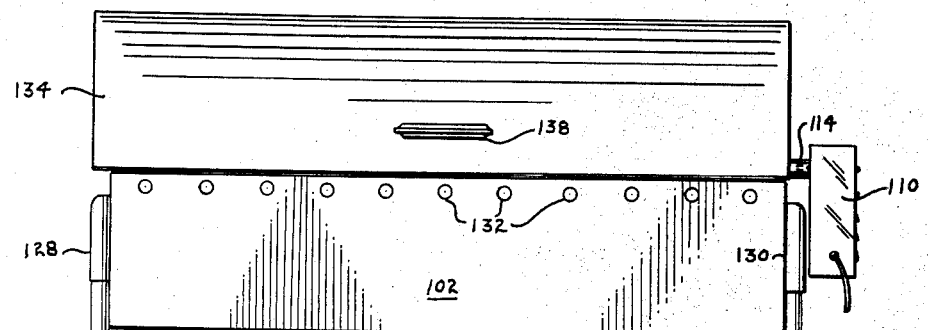
FIGURE 7 is a front elevational view of another embodiment of the present invention.
Figure 9:
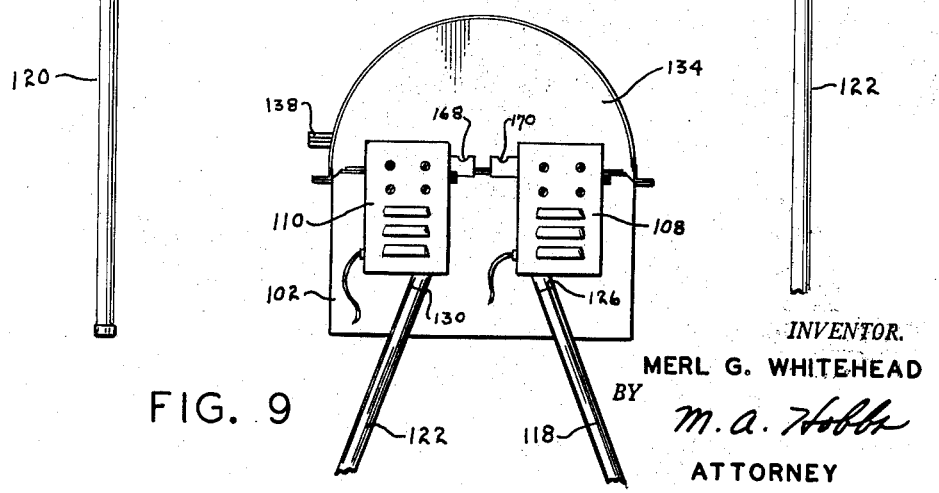
FIGURE 9 is an end elevational view of the embodiment shown in FIGURE 7.
Figure 14:
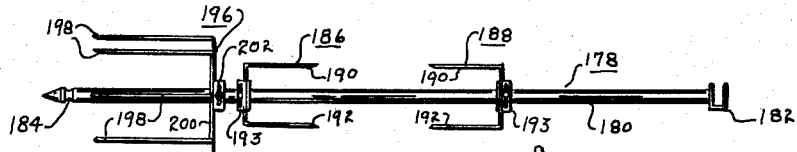
FIGURES 13 and 14 are elevational views of modified forms of meat holders which can be used in the present apparatus.
Figure 16:
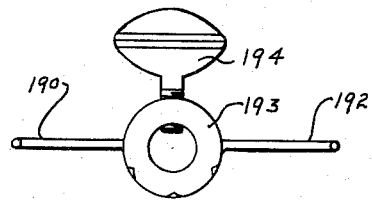
FIGURES 15, 16 and 17 show elevational details of the meat holder shown in FIGURE 14.
Figures 15, 17:
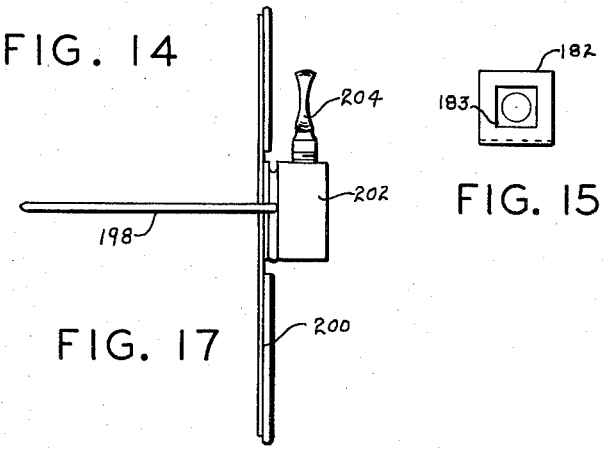

Meat holders 104 and 106 are similar in construction to those previously described, consisting of end plates 140 and 142 and spaced longitudinal and transverse rods or wires 144 and 146, respectively, welded together to form a rigid structure having a removable lid or cover 148 clamped or clipped to the adjacent side walls of the holder. End plate 140 contains a square hole 150 in the center for slipping on the inner square end 151 of shafts 112 and 114 forming a direct positive drive connection between the shafts and the holders. A short shaft 152 is secured to the center of plate 142 and extends outwardly therefrom seating in open top bearings 154 and 156 on the end of the pit opposite drive mechanisms 108 and 110. The holders are supported while they are being operated by shafts 112 or 114 and shaft 152 in bearings 154 or 156 and are easily removed from the apparatus for emptying or filling by merely lifting the left hand end, as seen in FIGURE 8, until it clears the adjacent end of the pit and then moving them endwise until plate 140 is clear of shaft 112 or 114. Normally the drive mechanism of the holder being removed is shut off; however, the holder can be placed in operation and removed while the mechanism is in operation.

Figure 13:
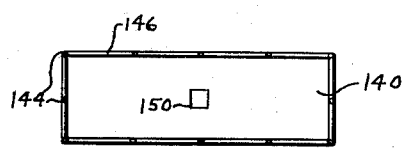
Figure 12:
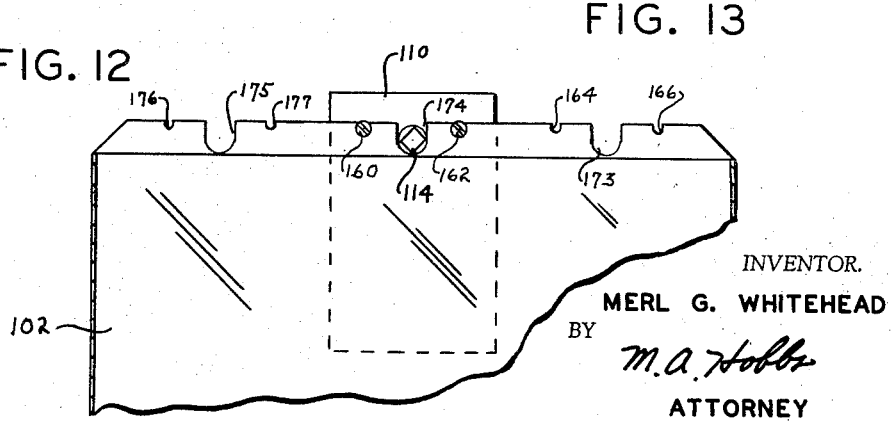

One of the important features of the present embodiment is the adaptability of the unit to various kinds and cuts of meat and to the various sizes of servings desired. One holder can be economically used by removing one of the drive mechanisms 160 and 162 from slipping fixtures 164 and 166, and inserting the fixtures in slots 168 and 170 near the center of the pit end. A bearing 172 is positioned in the center of the opposite end for receiving shaft 152. Slots 173, 174 and 175 are provided between the smaller slots for receiving shaft 114, slots 176 and 177 being provided on either side of slot 175 for fixtures 160 and 162. Basket-like meat holders of different cross sectional shapes than those previously described may be used advantageously for certain cuts and quantities of meat being prepared on the apparatus. In FIGURE 13 a relatively flat basket-like holder is shown. This holder is otherwise constructed the same as those shown in FIGURE 8.

Figure 10:
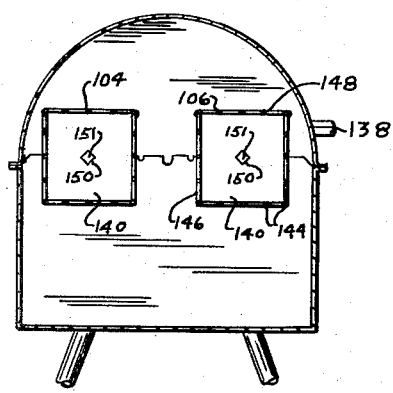
FIGURE 10 is a vertical cross sectional view of the apparatus taken on line 10—10 of FIGURE 7.
Figure 11:
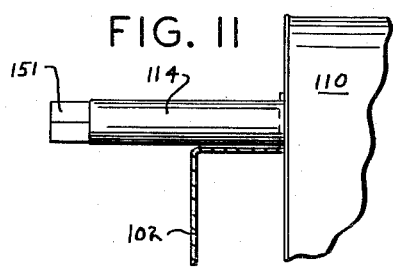
FIGURES 11 and 12 are fragmentary elevational views of the apparatus shown in FIGURE 7.

FIGURES 14 through 17 show a spit 178 which can be substituted for the previously described meat holders shown in FIGURES 8, 10 and 13. It consists of a rod 180 having a U-shaped fixture 182 secured to one end and having a square hole 183 in one side for slipping on the end of shafts 112 and 114. A groove 184 on the other end seats in one of bearings 154, 156 and 172, preventing fixture 182 from slipping from the end of shafts 112 or 114 while the spit is in operation. Two members 186 and 188 having opposed prongs 190 and 192 mounted on a hub 193 are adjustable longitudinally along rod 180 for holding roasts, hams, whole birds, and the like. The two members can easily be moved along the rod and after being placed in the desired location are held by thumb screws 194. A meat holding device 196 may also be mounted on rod 180 in place of or along with members 186 and 188 and is provided with a plurality of prongs 198 mounted on plate 200 and hub 202 for holding weiners and the like. This device is also adjustable along the rod and is held in place by thumbscrew 204.

In the operation of the foregoing barbecuing apparatus, a fire is started and a good bed of coals is obtained in the fire pan. The pan is then placed in the fire pit and one or more meat holders are filled with meat such as pieces of chicken and placed in operation over the pit. It may be desirable to start one of the holders and then wait a period of time before starting the second holder and still a longer period of time before starting the third in order to have meat ready for serving throughout an entire barbecue, picnic or the like. As the meat is served from one holder it is refilled and again placed in operation over the pit. After the first holder is mounted in place over the hot coals in the pit the motor is started so that the meat will be continuously turned while it is broiling, and satisfactory basting of the meat can be obtained without any of the meat juices dripping into the fire. Although the rotation of the holders will be relatively slow throughout their operation, to obtain the most satisfactory results the speed should be varied within limits as the heat given off by the fire in the pit varies, i.e. as the temperature increases and decreases the speed of the holders should be increased and decreased, respectively; however, minor variations in temperature do not require a change in speed.

While two embodiments of the barbecuing apparatus and various modifications have been described in detail herein, other modifications and changes may be made without departing from the scope of the present invention.

I claim:

1. A barbecuing apparatus, comprising an elongated rectangularly shaped fire pit having opposed side walls and ends, air holes in said side walls near the top thereof, legs supporting said pit, a plurality of frameless basket-like meat holders having a substantially square cross section and end plates and extending substantially the full length of said pit, a shaft projecting outwardly from the center of one of said plates, a rectangular hole in the center of the other end plate, motors mounted at one end of said pit and having a gear reduction mechanism for driving each of said holders, shafts operatively connected to the respective motors and having a rectangular end for seating in said hole in the end plate of the respective holder, a bearing with a permanently open top for receiving said first mentioned shaft, and a removable cover for said pit and holders.

2. A barbecuing apparatus, comprising an elongated fire pit having opposed side walls and air holes in each side wall, a frameless basket-like meat holder having a substantially square cross section and end plates, a shaft projecting outwardly from the center of one of said plates, a rectangular hole in the center of the other end plate, a motor mounted at one end of said pit for driving said holder, a shaft operatively connected to said motor for rotating said holder and having a rectangular end for seating in said hole in the end plate of the respective holder, and a bearing with a permanently open top for receiving said first mentioned shaft.

References Cited in the file of this patent
UNITED STATES PATENTS

| | | |
|---|---|---|
| 1,704,621 | Matiska | Mar. 5, 1929 |
| 2,046,352 | Warner | July 7, 1936 |
| 2,058,172 | Myers | Oct. 20, 1936 |
| 2,122,780 | Peyton | July 5, 1938 |
| 2,198,134 | Spiegl | Apr. 23, 1940 |
| 2,760,428 | Boyajian | Aug. 28, 1956 |
| 2,867,165 | Money | Jan. 6, 1959 |